(12) United States Patent
Robey (10) Patent No.: US 6,715,910 B2
(45) Date of Patent: Apr. 6, 2004

(54) VERTICAL CAROUSEL AND VERTICAL LIFT MODULE POSITION INDICATOR SYSTEM

(75) Inventor: Timothy Robey, Windham, ME (US)

(73) Assignee: Remstar International Inc., Westbrook, MA (US)

( * ) Notice: Subject to any disclaimer, the term of this patent is extended or adjusted under 35 U.S.C. 154(b) by 0 days.

(21) Appl. No.: 10/273,109

(22) Filed: Oct. 18, 2002

(65) Prior Publication Data

US 2003/0156428 A1 Aug. 21, 2003

Related U.S. Application Data

(63) Continuation-in-part of application No. 10/075,276, filed on Feb. 15, 2002.

(51) Int. Cl.[7] .......................... B64D 47/06; F21V 5/00; G09F 13/18
(52) U.S. Cl. ...................... 362/559; 362/133; 362/253; 362/551; 362/89
(58) Field of Search .................................. 362/559, 127, 362/133, 563, 564, 253, 551, 89

(56) References Cited

U.S. PATENT DOCUMENTS

| | | | |
|---|---|---|---|
| 5,670,778 A | | 9/1997 | Smith |
| 5,790,374 A | * | 8/1998 | Wong .......................... 361/685 |
| 5,799,124 A | * | 8/1998 | Zorn et al. ................... 385/125 |
| 5,915,824 A | * | 6/1999 | Straat .......................... 362/133 |

OTHER PUBLICATIONS

Connors et al., U.S. Publication No. US 2002/0147597 A1, Oct. 10, 2002.*
Remstar Pick–Light Technology, Remstar International Inc., Aug. 1998, 2 pages.
Horizontal Carousels Catalog, Remstar International Inc., no date, 6 pages.

* cited by examiner

Primary Examiner—Stephen Husar
Assistant Examiner—Sharon Payne
(74) Attorney, Agent, or Firm—Crowell & Moring LLP (57) ABSTRACT

A storage and/or retrieval system such as a Vertical Carousel (VC) or Vertical Lift Module (VLM), which has a common light source or light source grid, consists of LED's and the like incorporated into the body of the machine in proximity to the access point operator's workstation. When a storage carrier/tray is delivered to the access position, the common light source transmits light through one of a light transmitting element to an access face of the storage compartment position in relative proximity to the actual compartment's position. The light transmitting devices can be arranged in patterns dictated by the type of storage required (i.e., the number of compartments within the tray can vary in size and number) individually for different trays, and are delivered over a grid pattern of light sources for annunciation.

18 Claims, 10 Drawing Sheets

VERTICAL CAROUSEL AND VERTICAL LIFT MODULE POSITION INDICATOR SYSTEM

This application is a continuation in part from my original application Ser. No. 10/075,276, filed Feb. 15, 2002, the subject matter of which is incorporated in its entirety by reference herein.

BACKGROUND OF THE INVENTION

The present invention applies my earlier invention to other applications on storage & retrieval devices, by way of example, a Vertical Carousel (VC) and/or a Vertical Lift Module (VLM) system which include a light source with lights arranged in an array configured according to a particular requirement of the VLM system, and light transmission components that transfer the light source from a common point to a visible point on an access face of at least one movable tray (carrier) directly associated with a storage position.

Conventional VC and VLM systems include one or more machine (VC and/or VLM) with storage carriers or trays. A strip of horizontally disposed indicator lights (collectively known as a position light strip) is typically installed at the front of an operator workstation where carriers/trays are delivered for operator access. When the VC/VLM delivers a particular carrier/tray to the operator's access point, one of several position indicator lights on the adjacent light strip is illuminated. This typically indicates the horizontal position (left to right) of the desired item on the tray. However, in cases utilizing the VC, in cases where there are more than one "height" of storage compartments within this "column" position, the operator is forced to use another element (numeric display or supplemental height indicator light strip) to reference the actual desired compartment. In the case of the VLM, in cases where there are more than one "depth" of storage compartments within the selected "column" position, the operator is forced to use another element (numeric display or supplemental depth light strip) to reference the actual desired compartment. This is typical with trays containing a "partition and divider" system like customarily known in drawer cabinets, or even for totes subdivided in their depth.

SUMMARY OF THE INVENTION

An object of the present invention is to provide an improved indicator position system for storing and retrieving items in both VCs and VLMs (and other automated devices) which overcomes the disadvantages encountered with prior art electronic pick indicator systems in a simple and cost-effective manner.

This object has been achieved in accordance with the present invention by providing a common light source array created by LEDs, incandescent bulbs, halogen lamps, lasers, etc. integrated into the VC's housing behind the carrier positioned in the operator workstation access window. With respect to the VLM, the light source grid is installed in a workstation floor at the picking or storage access area underneath a selected tray. In both cases, when the selected carrier/tray is driven to the access position, the light is transmitted from the common light source to the picking or storing location in relative proximity to the actual compartment's position.

According to another important aspect of the present invention, an array of lights can be configured to a storage system's particular usage requirements. That is, more or less lights can be employed depending upon the product or box sizes, the number of partitions and dividers or compartment locations in the trays and the desired operation of the equipment. A significant advantage of the present invention is its flexibility at minimum constructional cost.

In accordance with one currently contemplated embodiment of the present invention, a common light source is not required on each moving carrier/tray, but rather at a designated picking area, behind or beneath the workstation where the carriers/trays of stored items are delivered for operator access. This has the advantage of minimizing the cost of the light source inasmuch as only one light source is required for each picking station on each VC/VLM, potentially serving all carrier/trays within the machine, rather than requiring light sources for each tray.

The present invention contemplates the use of light transmission devices (such as light pipes) at each position of the carrier/tray where needed or desired to transfer the light from the stationary light to a point (or points) on the face of the storage carrier/tray where an operator's attention would be quickly gained to grant immediate recognition of the compartment position from which one or more of the items are to be accessed.

The present invention is based on a recognition that the light transmission devices (Light Pipes) are a simple and inexpensive medium to move the light from a point behind the carrier or beneath the tray, to the access face where, for example, light pipe tips indicate the picking positions, typically at locations directly adjacent to the storage compartments indicating the actual items or parts.

An advantage of a light pipe system is that it serves as a medium to move the common light source from a stationary position behind or beneath the carrier/tray to the actual item's position.

It is further contemplated that light pipes can be installed on each tray carrier/shelf in patterns dictated by the type of storage required. In other words, more or less light pipes can be used at each carrier/tray depending upon the sizes and/or quantities of the stored items on that particular shelf.

A further advantage of the present invention is that the operator can now have an indication of the exact compartment position for the selected item, as well as of the transaction quantity. The tips of the light pipes can, if desired, be labeled with quantity indicators such as "1" or "2" so that the operator also has the transaction quantity directly at the point of access for storing or picking. Quantities that are not included in the "typical" tip would be shown via a non-labeled light pipe tip so as to cause the operator to refer to a common quantity display adjacent (above, below or to the side) to the picking/storage area. It is also contemplated that the tip could "blink out" a pattern for accessing small quantities of items, for example, two blinks followed by a pause which could indicate a transaction (store or retrieve) quantity of two. Various colors could also be used to indicate different processing requirements (e.g. Pick=green, Store=Red, Modify=Yellow, etc . . . ).

Another objective of the invention is to allow multiple operator workstations (in the VC or VLM) access to the same set of carriers/trays and compartments, utilizing the same traveling light pipes associated with each tray and compartment. In the case of the VC, this will be shown simply by sending the light through the pipe from the opposite end of the indicator. In the case of the VLM, this will be shown by the chosen geometry of the light pipe being able to disperse the light from the front or the back of the indicator's position.

Another object of the invention, in the case of the VC, is to minimize machine movement requirements. Traditional VCs place the desired carrier level at the same height as the operator's workstation surface, and illuminate a light in front of the position, to indicate the location for picking or storing parts. As the picking or storing operation commences, the carousel rotates to deliver the next carrier or carrier level to the workstation position, sometimes only a few inches at a time. In the case of this invention, since the light pipes give a clear position indication for the exact compartment including those above the workstation surface (not only the front bottom compartment) on the carrier(s), it is not always necessary to rotate the machine to the bottom level but rather to simply light any compartment within the height of the workstation opening, which is commonly two feet or more. This serves to speed the picking or storing operation by eliminating the wait time while the machine indexes; minimizes machine wear and tear; and reduces the average power consumption of the machine; and of course provides greater accuracy for the picking or storing operation.

BRIEF DESCRIPTION OF THE DRAWINGS

Other objects, advantages and novel features of the present invention will become apparent from the following description of the invention when considered in conjunction with the following referenced figures.

DETAILED DESCRIPTION OF THE DRAWINGS

Figure 1:
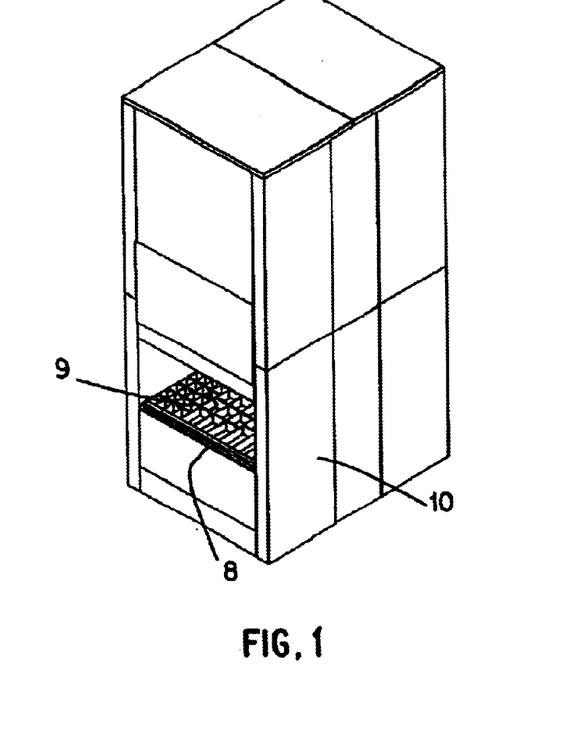
FIGS. 1, 1A, 1B and 1C are three perspective views and one side views respectively, of a VLM system, showing a VLM storage and retrieval apparatus enclosed with skins, including an operator workstation with a tray filled with storage compartments in position for operator access, with a grid of lights installed in the workstation floor.
Figure 1A:
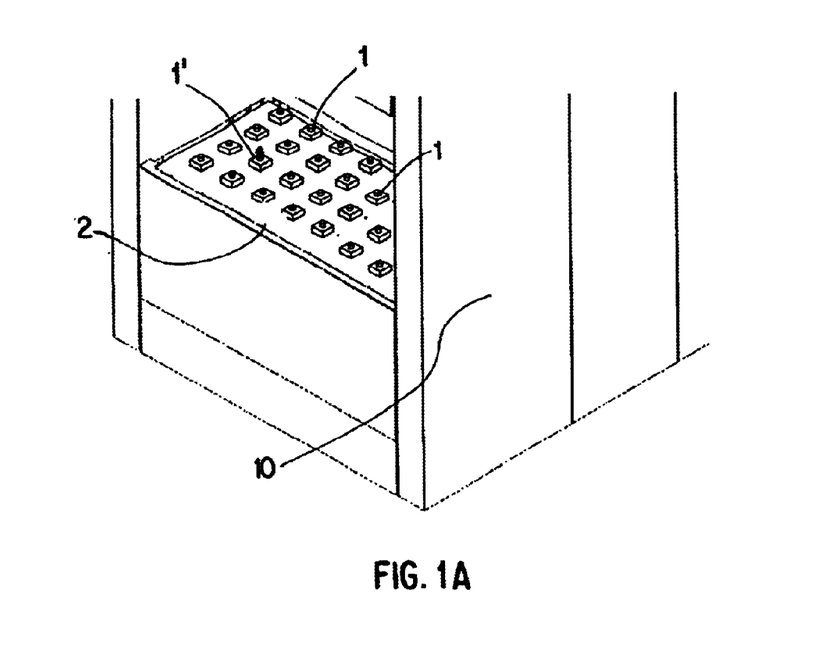
Figure 1B:
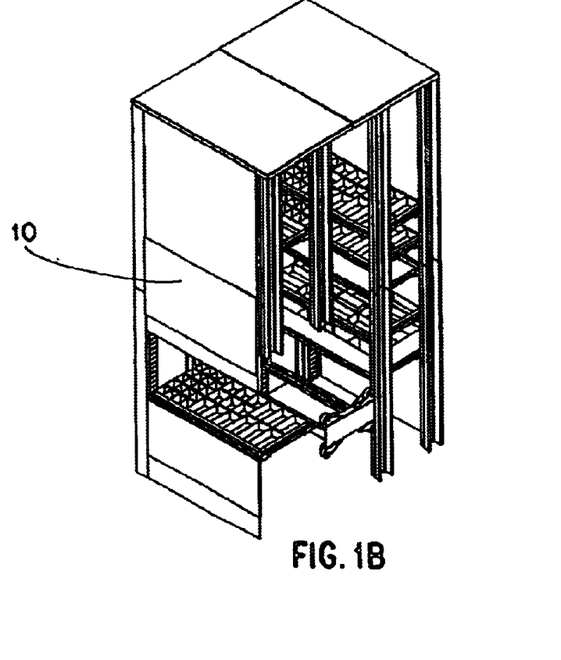
Figure 1C:
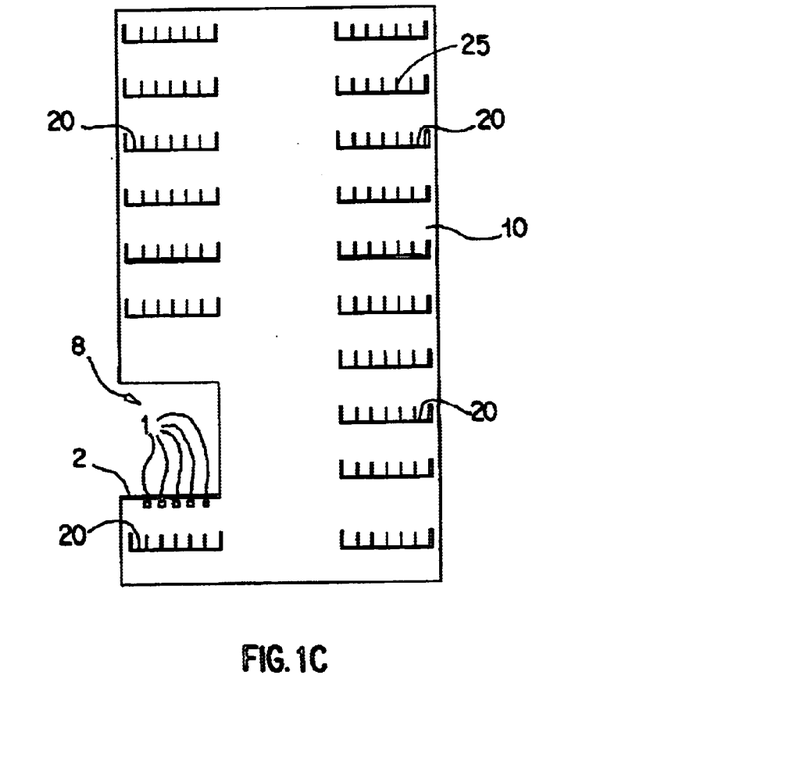

FIG. 1 is a perspective drawing of a VLM system (10) showing a storage and retrieval apparatus enclosed with skins, including an operator workstation area (8) with a storage tray (9) filled with storage compartments in position for operator access. FIG. 1A is a perspective view of the same VLM system's workstation, showing a view without the traveling storage tray (9) in position, exposing the fixed grid of common light sources (1, 1') for better disclosure of this element of the invention. FIG. 1B is a perspective view, and FIG. 1C is a side view, of the same VLM system, but with the enclosing skins cutaway to show where other trays (20) can be stored on both the front and the rear column of storage shelves. The common light source grid elements (1) are shown in the workstation (2) floor.

Figure 2A:
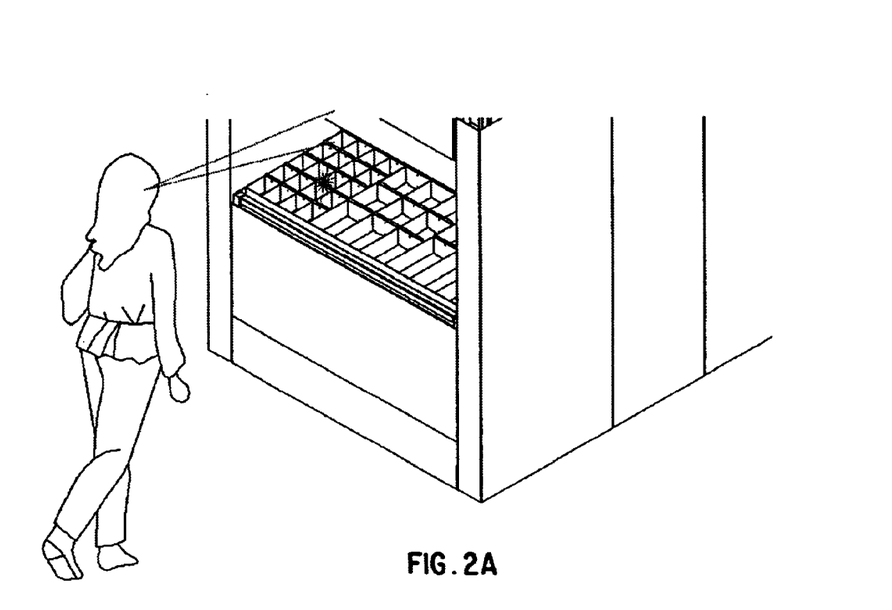
FIGS. 2A, 2B and 2C are two perspective views and one side view showing a closer detail of the workstation access area for the same VLM system shown in FIGS. 1–1C, and an operator shown in a typical standing position for storing and picking items from the compartments within the tray, as well as a further detail showing conceptually how the light from the light source grid can be moved from beneath the mobile storage tray to the top of the storage compartment, and then be emitted through a radius approximately 180 degrees allowing visibility from the front, top, and rear points of view.
Figure 2B:
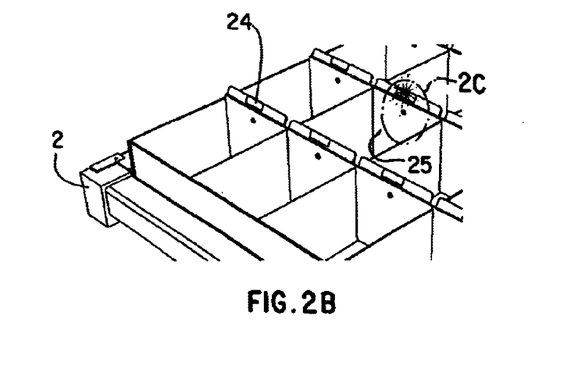
Figure 2C:
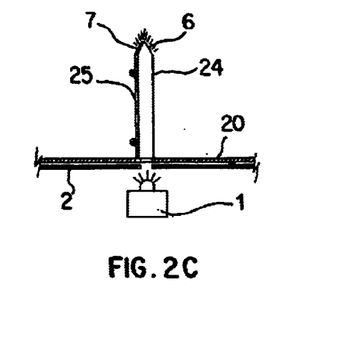

FIG. 2A is a perspective view showing a closer detail of the workstation access area of the VLM (10) shown in FIGS. 1–1C, and an operator approximately positioned where they typically stand for storing and picking items from the compartments within the tray, with the perspective view in FIG. 2B view showing a closer detail of the tray (20) and its storage compartments. The side view detail on FIG. 2C shows the operating principle of the present invention. A grid of fixed light sources, one of which is shown here and is designated by reference numeral (1), is fixed in the VLM's workstation (2) floor. A mobile tray (20) along with its storage compartments made up of dividers (25) is transported into position over the light source (1) to provide access to the stored contents for operators. When the light source (1) is activated as shown by the radiating lines, the light is transmitted through a hole in the bottom of the mobile tray (20) and up through the light transmission element (24), eventually causing the tip of the light pipe to glow as shown by radiating lines seen from the front angle (6) and the rear angle (7) of the light pipe (24). The front illumination (6) is intended for operator's accessing the item from workstations on the front face of the VLM, and the rear illumination (7) is intended for operator's accessing the item from workstations on the rear. In this case, the light pipe (24) is shown affixed to the compartment divider (25), but other embodiments of the present invention are contemplated, including (but not limited to) making the divider itself the light transmission pipe by producing it from a suitable material (e.g. clear or colored translucent plastic).

Figure 3A:
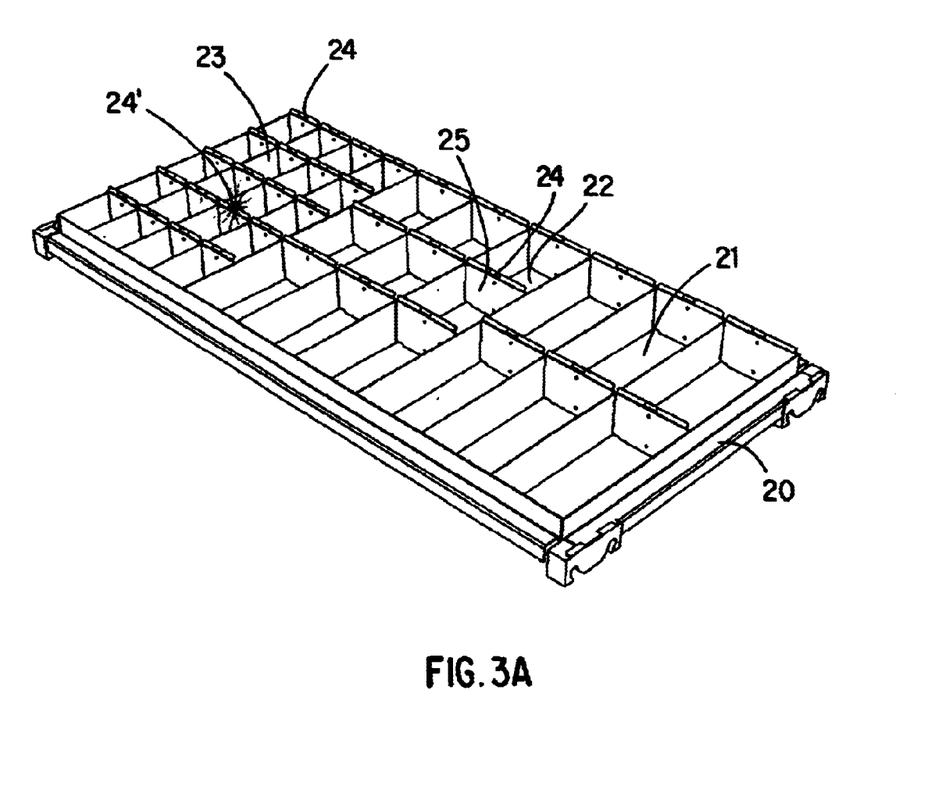
FIGS. 3A and 3B are perspective views of one of a VLM system's mobile trays and its associated variably sized storage compartments configured by dividers fitted with light transmission elements (Light Pipes).
Figure 3B:
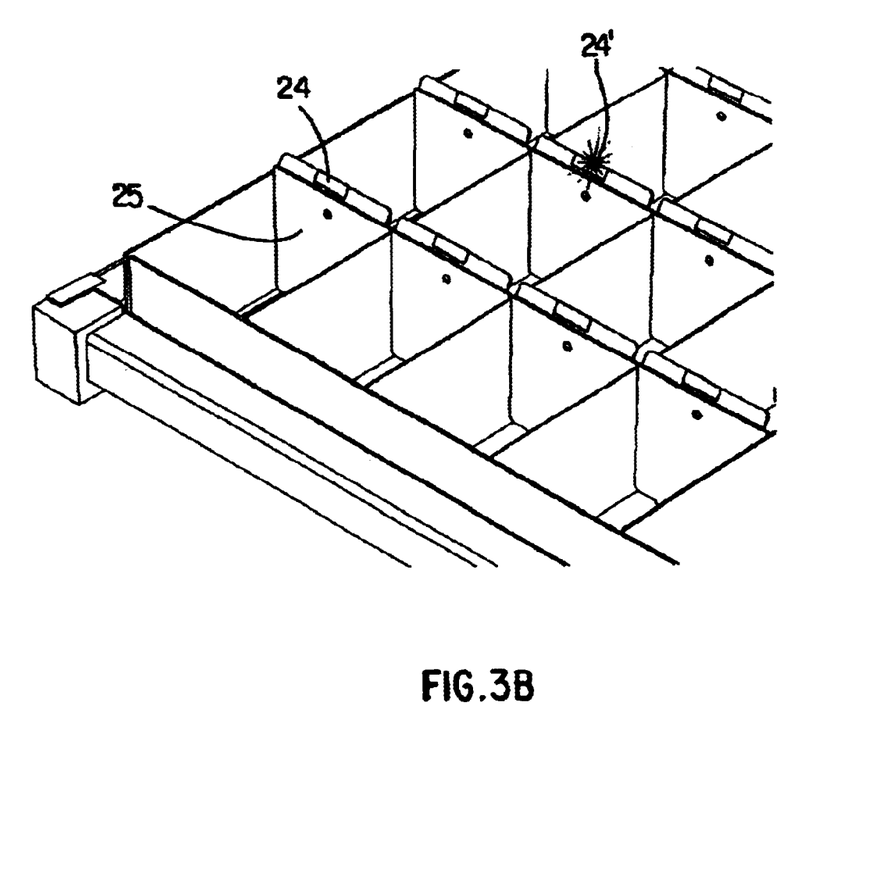

FIGS. 3A and 3B are perspective views of a traveling tray (20) and its associated variably sized storage compartments (21, 22) defined by dividers (23, 25) fitted with light transmission elements (24, 24'). The desired compartment is indicated to the operator via the illuminated light pipe (24') in this example.

Figure 4A:
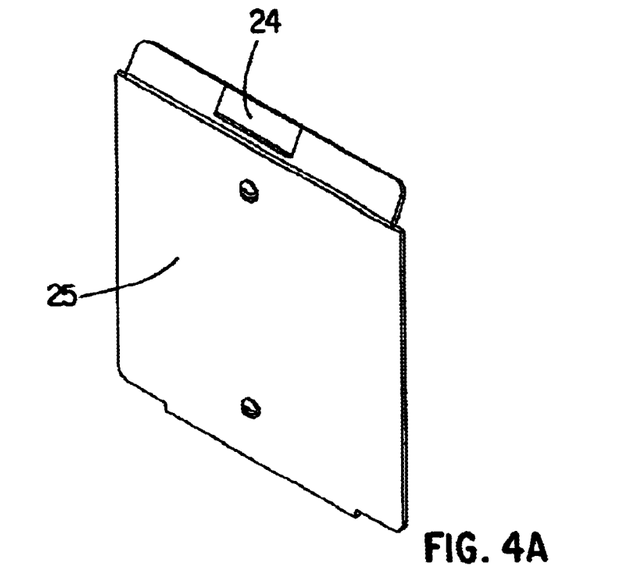
FIGS. 4A, 4B, 4C and 4D are perspective views of one example of a divider made up of a light transmitting element, showing how it can move the light from a light source to a visible point at the tip.
Figure 4B:
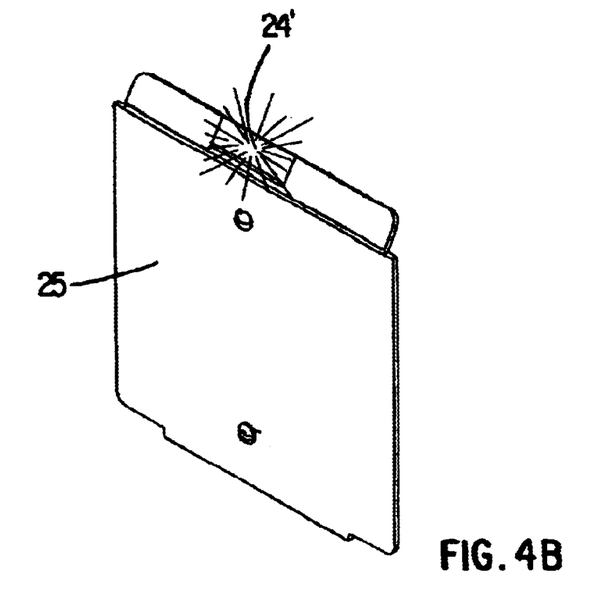
Figure 4C:
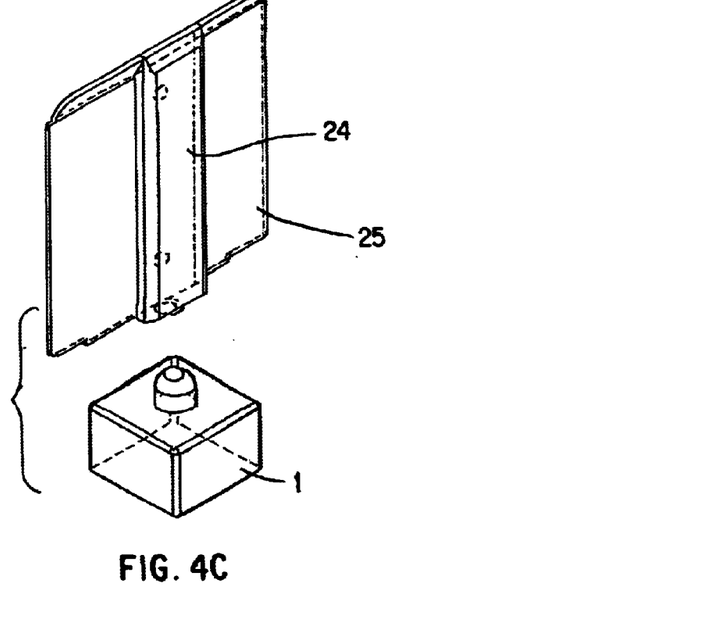
Figure 4D:
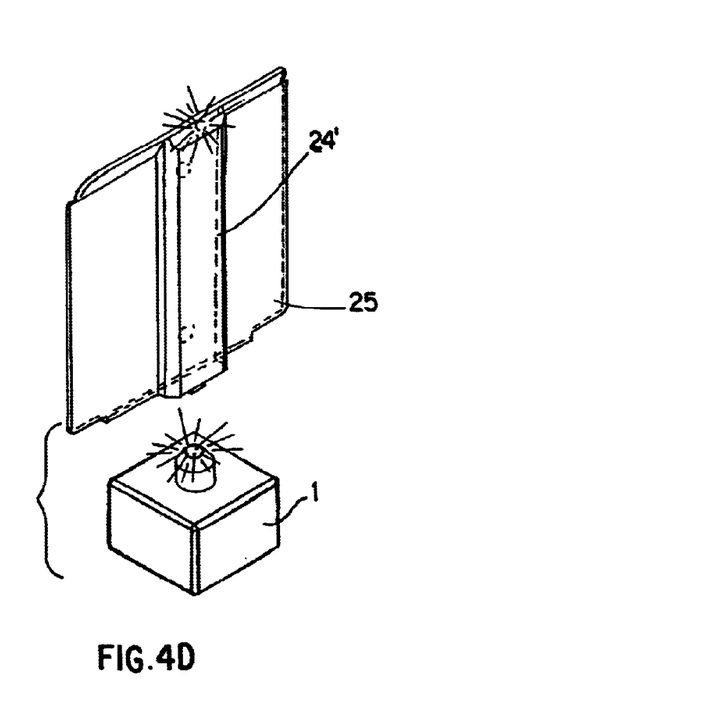

FIGS. 4A and 4B show a front and FIGS. 4C and 4D show a rear view detail of one version of a compartment divider (25) fitted with a light transmission element (24 and 24').

Figures 5A, 5B:
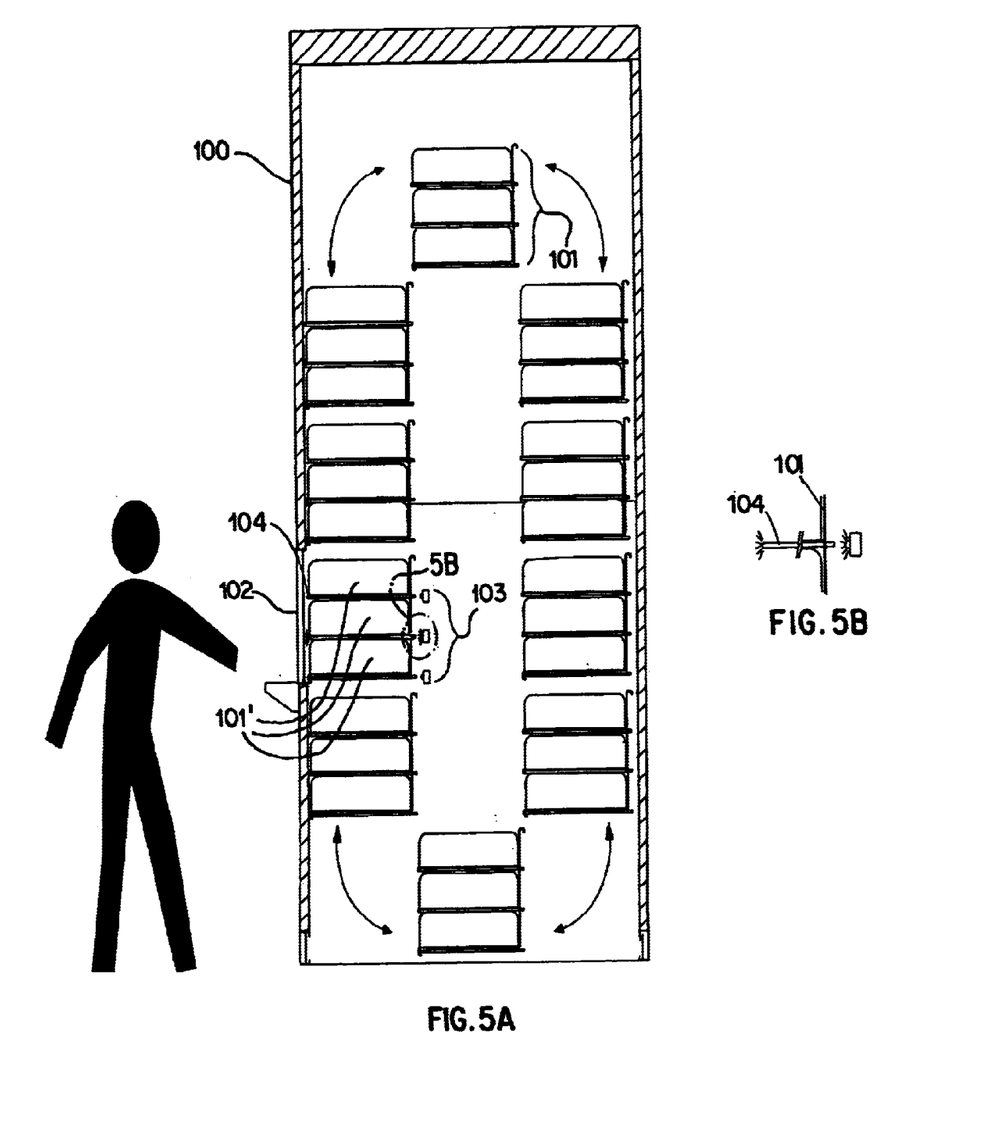
FIGS. 5A and 5B are respectively a side view of a VC with an operator standing at the access workstations, showing the rotational aspect of the carousel via curved arrows and the approximate mounting location of a light source and light transmission elements associated with the moving carriers and an isolated view detailing the concept of transferring light from a common light source to a face of the carrier.
Figure 6:
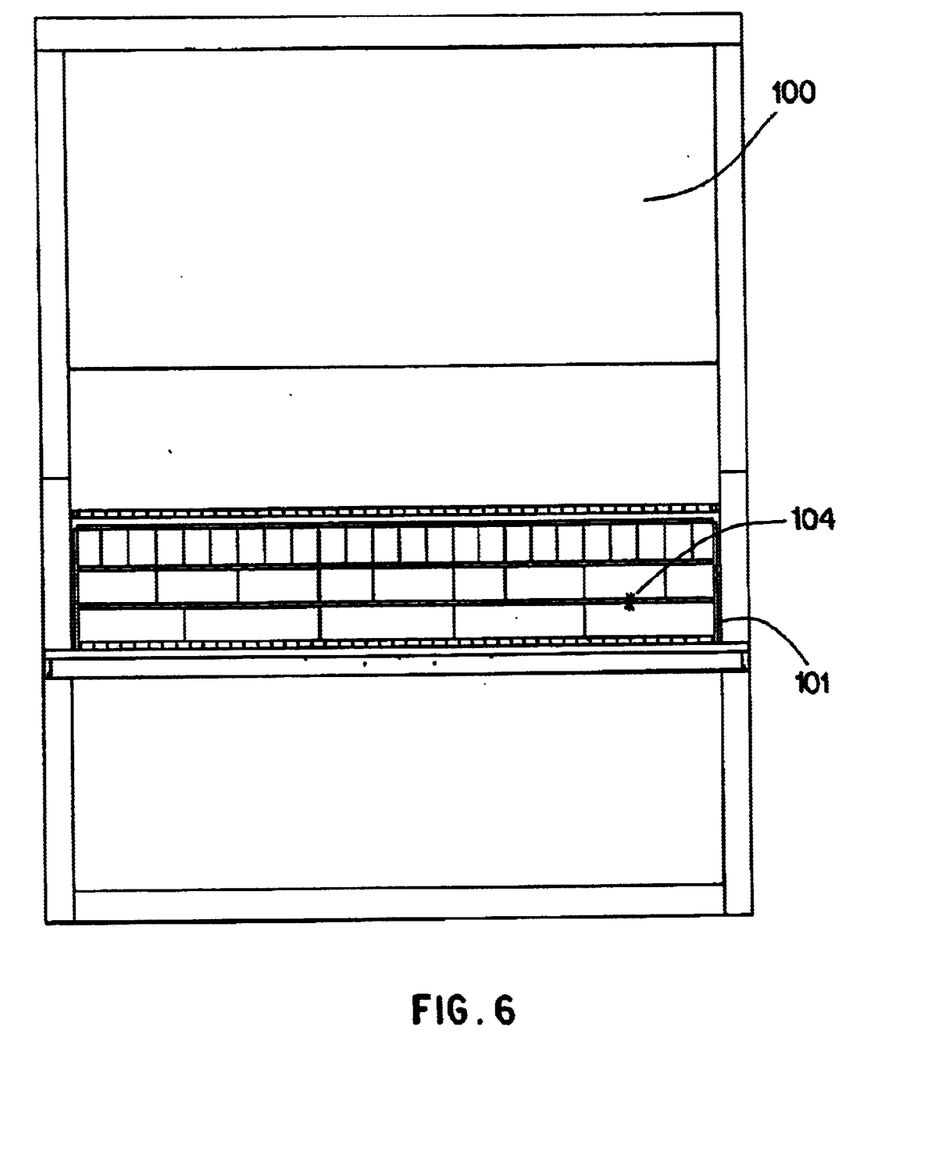
FIG. 6 is a front view of the VC shown in FIG. 5A.

FIG. 5A is a side view and FIG. 6 a front view, of a Vertical Carousel System (VCS) (100) excluding conventional features such as the motorized drive mechanisms used for rotation. The VCS has movable storage members or carriers (101), and an operator workstation area (102), fitted with a light source grid (103) mounted behind the carrier (101') in the workstation, and light transmission elements (104) installed in the carriers (101) to transfer the light from the point behind the carrier to the operator's viewable area indicating a compartment within the carrier. FIG. 5B is an isolated view detailing the concept of transferring light from a common light source through a light transmission element (104) to a face of the carrier (100). FIG. 6 is a front view of the same VCS (100), showing an example of a glowing light pipe (104) shown by the radiating lines, in a selected compartment on a carrier (101).

Figure 7A:
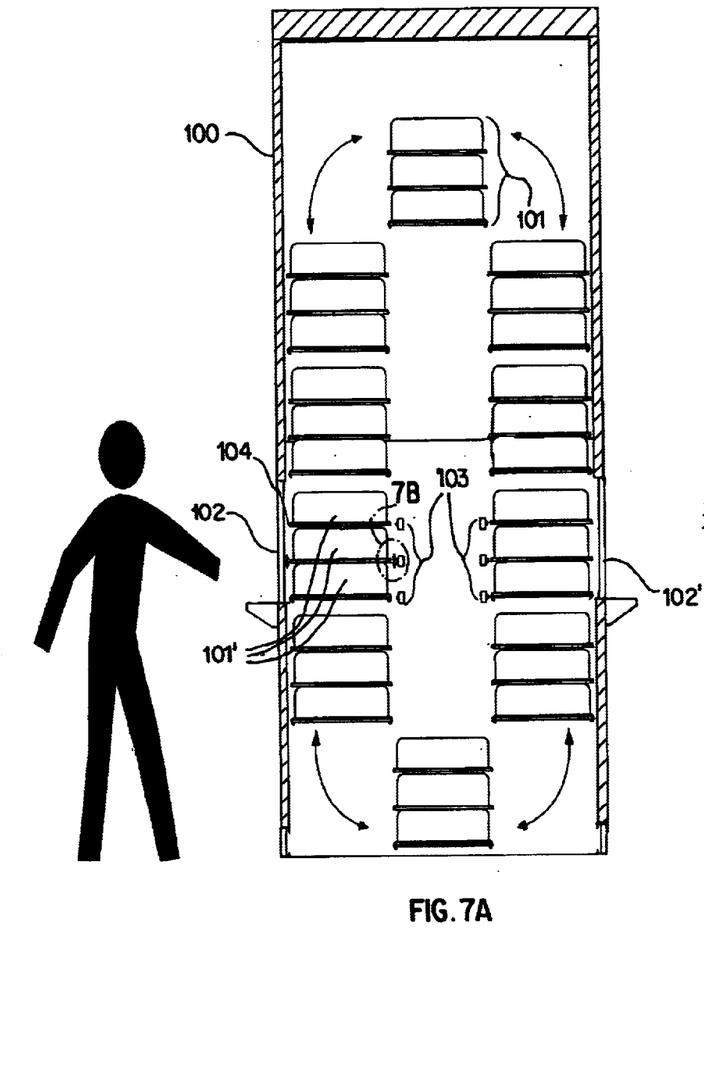
FIGS. 7A and 7B are, respectively, a side view and an isolated view of a VC with two workstations, graphically depicting how the same light transmission element can move the common light source to either side of the VC's carrier.
Figure 7B:
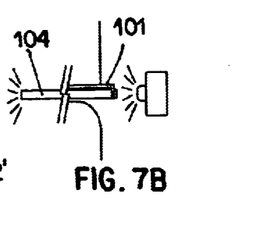

FIG. 7A is a side view of a multi-access Vertical Carousel System, showing two workstations on opposing sides, and two opposing light source grids (103) which serve the two workstations. The isolated view in FIG. 7B clearly demonstrates the "bidirectional" aspects of the light pipes and their ability to indicate the position on either a front or rear face of the carrier.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A storage and/or retrieval system, comprising at least one storage member movable in a vertical carousel and/or a vertical lift module system having at least one light transmission element associated therewith; and at least one light source located at a point of access to contents of a selected one of the at least one movable storage member, wherein the selected movable storage member is positioned relative to the light source and an operator so as to transmit light through the at least one light transmission element in close proximity to a location of an item to be processed in a compartment of the selected movable storage member.

2. The system according to claim 1, wherein the at least one movable storage member has at least one light pipe operatively associated therewith at respective compartment dividers, totes, or trays carried on the at least one movable storage member.

3. The system according to claim 1, wherein one or more of the at least one light transmission elements is labeled with a quantity of the item to be processed.

4. The system according to claim 1, wherein the light transmitted through the at least one light transmission element blinks at an appropriate rate and duty cycle to designate a transaction quantity.

5. The system according to claim 1, where the at least one light transmission element is driven by a light source of varying colors, or is colored itself, to indicate different processing requirements.

6. The system according to claim 1, wherein the at least one light source is stationarily mounted in the storage and retrieval system.

7. The system according to claim 1, where the at least one light transmission element is bidirectional.

8. A storage and/or retrieval system, comprising:

a storage member movable in a vertical carousel and/or vertical lift module system having a light transmission element; and a light source;

wherein the movable storage member is positioned relative to the light source so as to transmit light from the light source through the light transmission element to a compartment of the movable storage member.

9. The system according to claim 8, wherein the light transmission element is affixed to a divider of the compartment.

10. The system according to claim 8, wherein the light source is included at a workstation floor of the system.

11. The system according to claim 8, wherein the light source is included in a grid of light sources.

12. The system according to claim 8, wherein the light source conveys a quantity of an item to be selected from the movable storage member by a corresponding number of blinks from the light source.

13. The system according to claim 8, wherein the light transmission element is a light pipe.

14. A method of indicating a position of an item in a storage member, comprising:

moving a storage member in a vertical carousel and/or vertical lift module system having a light transmission element to a position relative to a light source; and transmitting light from the light source through the light transmission element to a compartment of the storage member at the position of the item in the storage member.

15. The method according to claim 14, wherein the light transmission element is affixed to a divider of the compartment.

16. The method according to claim 14, wherein the light source is included at a workstation floor of the system.

17. The method according to claim 14, wherein the light source is included in a grid of light sources.

18. The method according to claim 14, further comprising conveying a quantity of an item to be selected from the movable storage member by blinking the light source with a corresponding number of blinks.

* * * * *